H. S. NORMAND.
SNAP FASTENER.
APPLICATION FILED OCT. 7, 1918.

1,358,098.

Patented Nov. 9, 1920.

Inventor:
Henry S. Normand
by Robt. P. Hains,
Attorney.

UNITED STATES PATENT OFFICE.

HENRY S. NORMAND, OF WATERBURY, CONNECTICUT, ASSIGNOR TO KEYSTONE SNAP FASTENER CORPORATION, OF PHILADELPHIA, PENNSYLVANIA, A CORPORATION OF VIRGINIA.

SNAP-FASTENER.

1,358,098.

Specification of Letters Patent.

Patented Nov. 9, 1920.

Application filed October 7, 1918. Serial No. 257,114.

*To all whom it may concern:*

Be it known that I, HENRY S. NORMAND, a citizen of the United States, residing at Waterbury, county of New Haven, and State of Connecticut, have invented an Improvement in Snap-Fasteners, of which the following description, in connection with the accompanying drawings, is a specification, like characters on the drawings representing like parts.

The invention to be hereinafter described relates to snap fasteners for gloves and other purposes.

These snap fasteners usually comprise a socket part and a stud part secured to fabrics to be detachably connected, the stud of the stud part being adapted to snap into the socket of the socket part to connect the fabrics.

One of the objects of the invention is to provide a socket part comprising simple members which may be died out and formed from sheet metal, the construction of the members being such that after placing the members on opposite sides of a fabric, a neck of one may be inserted into an annular groove in the other, the groove being formed to clench the neck to the groove as the members are pressed together, thereby effectively to secure the members to the fabric between them.

Another object is to provide a stud part comprising simple members which may be died out and formed from sheet metal, the construction of the members being such that after placing the members at opposite sides of a fabric, a neck of one may be inserted into a recess of the other, the recess being formed to clench the neck to an in-turned flange surrounding said recess as the members are pressed together, thereby effectively to secure the members to the fabric between them.

And another object of the invention is to provide a socket part and a stud part, each with a member having a neck which may force a portion of the fabric to which it is applied into the annular groove or recess of another member so as to effectively grip the fabric and contribute to the secure assembly of the members.

With the aforesaid and other objects in view, the character of the invention may be best understood by reference to the following description of one good form thereof shown in the accompanying drawing, wherein:—

Figure 1:
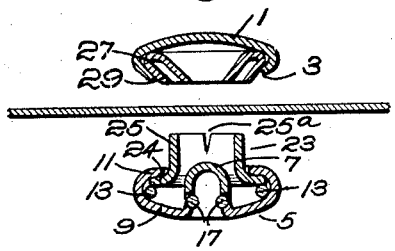
Figure 1 is a vertical section through unassembled members of the socket part of the fastener.

Referring to the drawing, the snap fastener shown therein as one good form of the invention comprises a socket part, in the present instance, comprising a cap member 1 (Fig. 1) having an in-turned flange 3. This cap member may be of any suitable metal, and may be smooth, decorated or marked as desired to constitute the visible button of the fastener when the parts thereof are snapped together. This cap member is adapted to be placed on one side of a fabric, the latter term being selected herein as generic to any material to which the fastener is to be applied.

The socket member 5 (Fig. 1) has a hollow head 7 formed therein preferably centrally thereof, and projecting a substantial distance up from the base 9 of the socket member. The circumferential margin of the base may be pressed upward and inward to present an in-turned lip 11.

Suitable spring means may be mounted in the socket member and coöperate with the hollow head thereof to detachably connect the stud of the stud part, to be described, to the socket part. In the present instance, this spring means comprises a wire spring 13 formed to present legs 15 projecting into diametrically opposed slots 17 in the socket head, reverse bends 19, and a curved portion 21 connecting said reverse bends. This curved portion may be located between the base and lip of the socket member, as will be noted in Fig. 1.

The socket member is adapted to be placed on the opposite side of the fabric from the cap member. An important feature of the invention relates to means for connecting the cap member and the socket member. To accomplish this, in the present instance, an eyelet 23 is provided preferably permanently connected to the socket member. The lower end of the eyelet may have an out-turned lip 24 which may be confined between the curved connecting portion of the spring and the in-turned lip of the socket member. The eyelet may have a neck 25 adapted to be connected with the cap member. To accomplish this, in the present form of the invention, the cap member 1 may be provided with a ring or member 27 containing an annular groove 29 flaring upwardly so as to have a greater diameter at the base of the groove than at the open end of the groove which seats against the fabric. The ring may be securely retained in the cap member by the in-turned flange 3 of the latter.

The construction is such that when the cap member and socket member are pressed together at opposite sides of the fabric, the end of the neck of the eyelet will be forced outwardly by the flaring groove of the ring, and thereby securely clench the eyelet to the ring and cap. The end of the neck of the eyelet may penetrate the fabric, or it may force a portion of the fabric into the annular groove of said ring. In the latter case the fabric may wrap around the end of the neck of the eyelet and be clamped to the ring when said neck is clenched thereto as described. The end portion of the neck may have notches $25^a$ cut therein to facilitate the clenching thereof to the ring.

Figure 2:
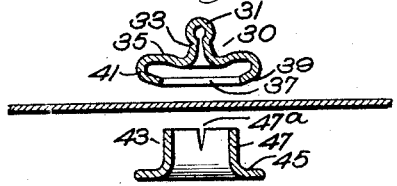
Fig. 2 is a vertical section through unassembled members of the stud part of the fastener.
Figure 3:
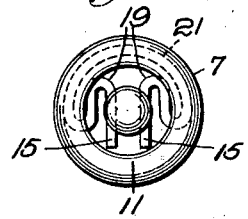
Fig. 3 is a plan of the socket member and its spring.
Figure 4:
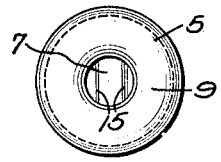
Fig. 4 is a bottom view of the socket member.
Figure 5:
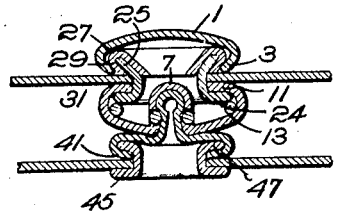
Fig. 5 is a vertical section through the parts shown in Figs. 1 and 2 showing the members assembled and the parts secured to fabrics to be connected.

The stud part of the fastener, in the present instance of the invention, comprises a member 30 (Fig. 2) having a stud 31 with an enlarged head adapted to be inserted in the hollow head of the socket member, and be detachably secured therein by the legs of the spring which may snap into a circumferential groove 33 in said stud.

An important feature of the invention relates to means for securing the stud member to a fabric. To accomplish this, in the present form of the invention, the stud member is provided with a base 35 formed to present a recess 37 between a circumferential shoulder 39 at the root of the stud, and an in-turned flange 41 surrounding the recess. Preferably the latter is formed to present a slight curvature between said shoulder and flange.

The base of the stud is adapted to be placed on one side of a fabric. Coöperating with this base is an eyelet 43 having a flange 45 for engagement with the opposite face of the fabric from said base, said eyelet having a neck 47 adapted to enter the recess in said base when the eyelet and base are pressed together. The construction is such that the end of the neck of the eyelet will engage the recess of the base and be curved over around the curved surface of said recess and be clenched to the in-turned flange surrounding said recess. The neck of the eyelet may penetrate the fabric, or a portion of the latter may be forced by said neck into said recess, and in the latter case the fabric will wrap around the end of the neck and be confined between the same and the in-turned flange of the recess. To facilitate the clenching of the neck, the end portion thereof may have notches $47^a$ cut therein.

A socket part and a stud part constructed as described, may be securely attached to the fabrics to be connected, and will effectively prevent said parts from being pulled from the fabric to which they are attached in pulling the stud member from the socket member to separate the parts of the fastener.

All of the members of the fastener, with the exception of the spring, may be conveniently died out of and formed from sheet metal, and said members may be easily and readily assembled. Thus, there is provided a fastener which is very cheap in construction, but is strong and efficient in operation.

It will be understood that the invention is not limited to the specific embodiment shown, but that various deviations may be made therefrom without departing from the spirit and scope of the appended claims:—

What is claimed is:

1. A snap fastener comprising an annular grooved ring for application to one side of the fabric and having its inner and outer annular walls similarly flared away from the fabric, a separate cap mounted upon said ring and having an inturned circumferential flange embracing said ring, said flange and ring provided with adjacent edges positioned to engage the fabric; a socket member for application to the opposite side of the fabric comprising a stud receiving base, and a neck for insertion into the annular groove of said ring and clenched therein automatically on such insertion.

2. A snap fastener comprising a hollow cap having an inturned circumferential flange for application to one side of the fabric, an annular grooved ring within the cap having the groove-forming walls parallel and flared away from the fabric, said cap being separate from the ring and having its inturned flange positioned to embrace the ring with the edge of the flange adjacent an edge of the ring, that said edges may engage the fabric, a socket member for application to the opposite side of the fabric having a stud receiving base, and a neck for insertion into the annular groove of the ring and clenched therein automatically on such insertion, said groove-forming walls engaging the inner and outer surfaces of said neck throughout the depth of said groove.

3. A snap fastener comprising a cap for application to one side of the fabric, said cap having an annular groove therein possessing a greater diameter at its bottom than at its entrance; a socket member for application to the opposite side of the fabric having a neck for insertion into the annular groove of the cap and clenched therein automatically on said insertion, a base connected to said neck and having an inwardly-extending, stud-receiving head entering said neck, said head having slits therein and a spring mounted in said base and having portions projecting into said slits for engagement with a stud inserted in said head.

In testimony whereof, I have signed my name to this specification.

HENRY S. NORMAND.